United States Patent
Dendo et al.

(10) Patent No.: US 7,246,837 B2
(45) Date of Patent: Jul. 24, 2007

(54) APPARATUS FOR ATTACHING VEHICLE OCCUPANT PROTECTION MEMBER TO BODY PANEL AND ASSEMBLIES USING SUCH APPARATUS

(75) Inventors: Masashi Dendo, Toyohashi (JP); Takahiro Sano, Toyohashi (JP); Junji Adachi, Ichinomiya (JP)

(73) Assignee: Newfrey LLC, Newark, DE (US)

( * ) Notice: Subject to any disclaimer, the term of this patent is extended or adjusted under 35 U.S.C. 154(b) by 326 days.

(21) Appl. No.: 10/912,068

(22) Filed: Aug. 6, 2004

(65) Prior Publication Data

US 2005/0029790 A1 Feb. 10, 2005

(30) Foreign Application Priority Data

Aug. 7, 2003 (JP) ............... 2003-288851

(51) Int. Cl.
*B60N 3/006* (2006.01)
*B60R 21/004* (2006.01)

(52) U.S. Cl. ............... 296/75; 296/187.05; 24/289; 24/297; 411/508

(58) Field of Classification Search ............... 296/1.06, 296/72, 75, 97.23, 187.05; 24/289, 292, 24/293, 295, 297, 453, 458; 280/751, 752; 411/500, 508, 510, 513, 529, 908
See application file for complete search history.

(56) References Cited

U.S. PATENT DOCUMENTS

| 1,754,672 | A | * | 4/1930 | Dyresen | 24/688 |
|---|---|---|---|---|---|
| 2,733,067 | A | * | 1/1956 | Moore et al. | 273/270 |
| 2,946,612 | A | * | 7/1960 | Ahlgren | 292/17 |
| 3,038,747 | A | * | 6/1962 | Rapata | 292/17 |
| 3,118,644 | A | * | 1/1964 | Wernig | 248/73 |
| 3,678,798 | A | * | 7/1972 | Van Niel | 411/43 |
| 3,701,373 | A | * | 10/1972 | Wronke et al. | 411/182 |
| 4,176,428 | A | * | 12/1979 | Kimura | 24/326 |
| 4,865,505 | A | * | 9/1989 | Okada | 411/512 |
| 5,193,961 | A | * | 3/1993 | Hoyle et al. | 411/553 |
| 5,429,467 | A | * | 7/1995 | Gugle et al. | 411/182 |
| 5,533,237 | A |  | 7/1996 | Higgins | 24/289 |
| 5,649,783 | A | * | 7/1997 | Ichikawa et al. | 403/386 |
| 6,102,466 | A | * | 8/2000 | Kanazawa et al. | 296/75 |
| 6,132,154 | A | * | 10/2000 | Easter | 411/508 |
| 6,158,766 | A | * | 12/2000 | Kowalski | 280/730.1 |
| 6,224,133 | B1 | * | 5/2001 | Abramoski et al. | 296/75 |
| 6,283,529 | B2 | * | 9/2001 | Kitagawa | 296/75 |
| 6,761,389 | B2 | * | 7/2004 | Akasaka et al. | 296/75 |
| 6,821,598 | B2 | * | 11/2004 | Gensler | 428/95 |
| 6,910,724 | B2 | * | 6/2005 | Kato | 296/75 |

(Continued)

FOREIGN PATENT DOCUMENTS

DE 100 32 734 1/2001

(Continued)

*Primary Examiner*—D. Glenn Dayoan
*Assistant Examiner*—Paul Chenevert
(74) *Attorney, Agent, or Firm*—Miles & Stockbridge P.C.

(57) ABSTRACT

An apparatus for attaching a sheet-form member for protecting vehicle occupants comprises a clip that is secured in an attachment hole in a body panel. The clip has a flange that covers edge portions of the attachment hole and has a protection member attaching part that receives and retains an engagement part of the protection member, which may be a soft elastic sheet.

18 Claims, 8 Drawing Sheets

U.S. PATENT DOCUMENTS

| | | | |
|---|---|---|---|
| 6,951,360 B2 * | 10/2005 | Nabert et al. | 296/75 |
| 7,017,978 B2 * | 3/2006 | Murakami et al. | 296/187.05 |
| 7,055,893 B2 * | 6/2006 | Yamamura et al. | 296/187.08 |
| 2003/0200634 A1 * | 10/2003 | Hansen | 24/297 |
| 2005/0029790 A1 * | 2/2005 | Dendo et al. | 280/751 |

FOREIGN PATENT DOCUMENTS

| | | |
|---|---|---|
| JP | 59-164238 | 9/1984 |
| JP | 2-56732 | 4/1990 |
| JP | 5-40034 | 5/1993 |
| JP | 2002-331895 | 11/2002 |

\* cited by examiner

APPARATUS FOR ATTACHING VEHICLE OCCUPANT PROTECTION MEMBER TO BODY PANEL AND ASSEMBLIES USING SUCH APPARATUS

CROSS-REFERENCE TO RELATED APPLICATION

This application claims the benefit of Japanese Patent Application No. 2003-288851 filed Aug. 7, 2003, incorporated herein by reference.

BACKGROUND OF THE INVENTION

The present invention relates to an apparatus for attaching, to a body panel, a vehicle occupant protection member for absorbing impact energy directed to a person's feet, for example, and protecting the person from injury. The present invention also relates to assemblies using such apparatus.

Sheet-form protection members for absorbing impact energy are attached to body panels such as dashboards to protect drivers and other vehicle occupants. See, for example, Laid-Open Patent Application [TOKKAI] No. 2002-331895, gazette (Patent Literature 1). Conventional methods for attaching protection members to body panels include methods such as welding bolt studs at prescribed positions on the body panel, and pushing in cylindrical bodies equipped with flanges to engage bolt studs inside attachment holes. An apparatus for attaching insulators and carpet, somewhat similar to vehicle occupant protection members, to a body panel is disclosed, for example, in Laid-Open Utility Model Application [JIKKAI] No. H5-40034/1993, gazette (Patent Literature 2). In that apparatus, bolt studs are welded to a body panel, and flange-equipped clips are engaged to the bolt studs to attach the insulators and carpet. Such an attachment scheme requires that bolt studs be welded at prescribed positions on the body panels, requiring welding equipment and increasing work steps and work time on automobile manufacturing or assembly lines.

Laid-Open Patent Application No. S59-164238/1984, gazette (Patent Literature 3) discloses an apparatus for attaching insulators and carpet to body panels using clips, with the intent of improving the way things are done prior to directly attaching insulators and carpet to body panels with screws. Using this apparatus, main clip units are affixed to the body panels with screws, clip guide plates are secured to the insulators, the clip guide plates are coupled, so that they can slide, to flange parts of the main clip units, and the insulators and carpet are thereby attached to the body panels. Even with this attachment apparatus, however, on an automobile manufacturing or assembly line, the operation of screwing the main clip units to the body panels is necessary and, although no equipment such as a welder is necessary, many work steps and much work time are required on the manufacturing or assembly line.

In Laid-Open Utility Model Application No. H2-56732/1990, gazette (Patent Literature 4) is disclosed an attachment structure by which a plastic panel having engagement projections projecting downward is affixed to the underside of the edges of carpet, the engagement projections are inserted into attachment holes in a deck, and the edges of the carpet are attached to the deck. Because the carpet attached to the deck is a sheet-form member exhibiting considerably high hardness but lower elasticity than soft elastic sheet-form members such as vehicle occupant protection members or insulators and the like, the plastic panel having engagement projections projecting downward can be definitely secured. However, in the case of soft elastic sheet-form members such as vehicle occupant protection members or insulators, if a plastic panel having downwardly projecting projections is affixed and engagement projections are inserted into the body panel, because of the soft and elastic properties, the engagement force will be small, and it is very difficult to obtain a condition wherein definite securing to the body panel is effected.

BRIEF DESCRIPTION OF THE INVENTION

Accordingly, an object of the present invention is to provide an improved apparatus for securely attaching vehicle occupant protection members, even soft elastic sheet protection members, to a body panel. The present invention provides the desired result without the necessity of welding bolt studs to the body panel.

Another object of the invention is to provide assemblies using the improved apparatus.

The present invention uses a clip that is inserted into and secured in an attachment hole of a body panel. In a preferred embodiment, the clip has a peripheral flange that covers edge regions of the attachment hole. Within the flange, there is a protection member attaching part for receiving and retaining an engagement part of the protection member.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

A first embodiment of a clip 1 in accordance with the invention is shown in FIGS. 1-9. The clip 1, which is preferably an integral molding of a hard plastic or other synthetic resin, comprises a flange 7 which conforms to the shape of the outer edge of an attachment hole in the body panel, and extends along the entire periphery of the attachment hole so as to fit flush against outer edge portions of that attachment hole. First pawls 9 (at least one) are formed at prescribed locations along the flange 7, for insertion into the attachment hole to engage edge regions of the attachment hole from below. The clip also comprises a protection member attaching part 10 formed within the flange 7.

Figure 1:
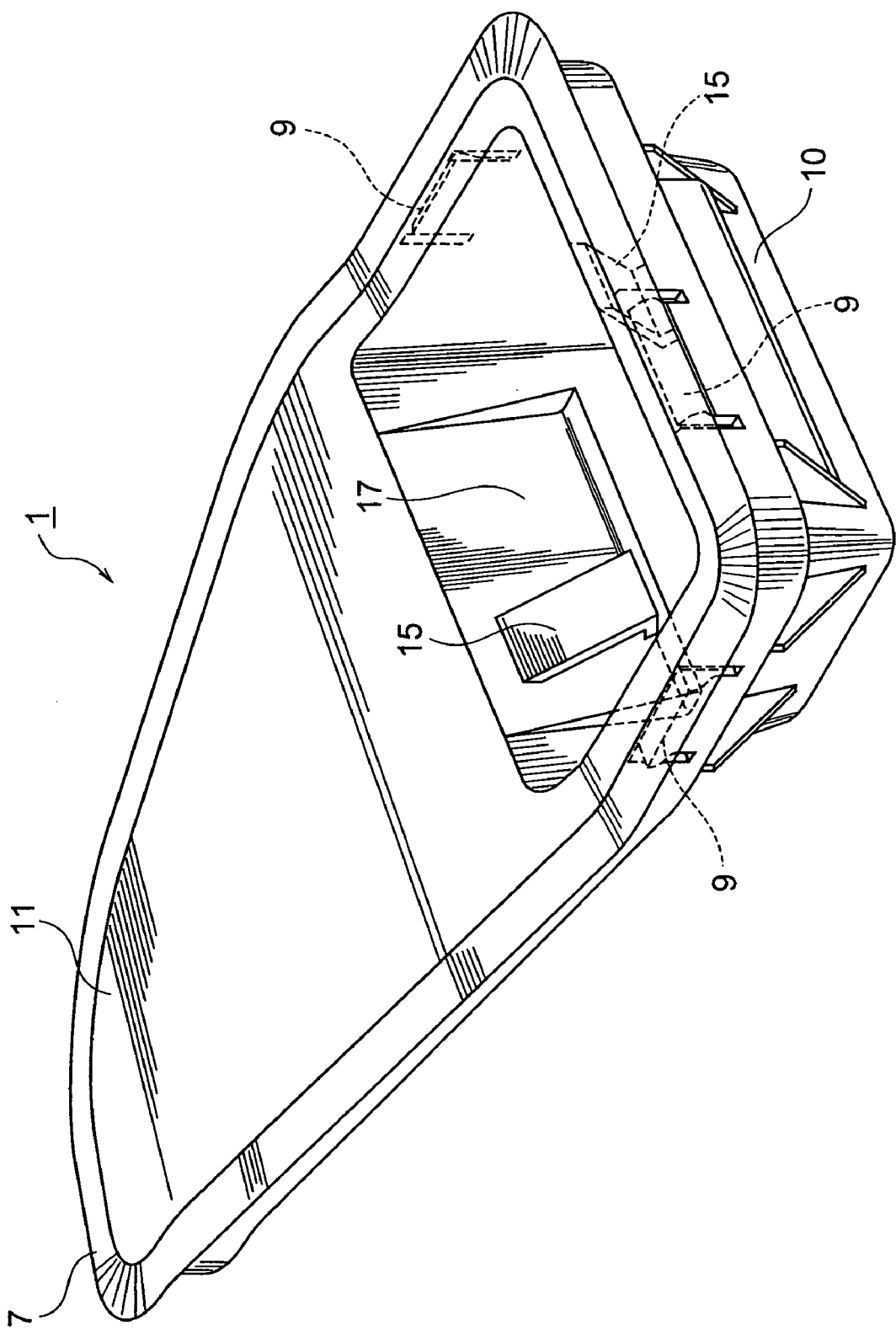
FIG. 1 is a perspective view of a clip of a protection member attaching apparatus relating to one embodiment of the present invention.
Figure 2:
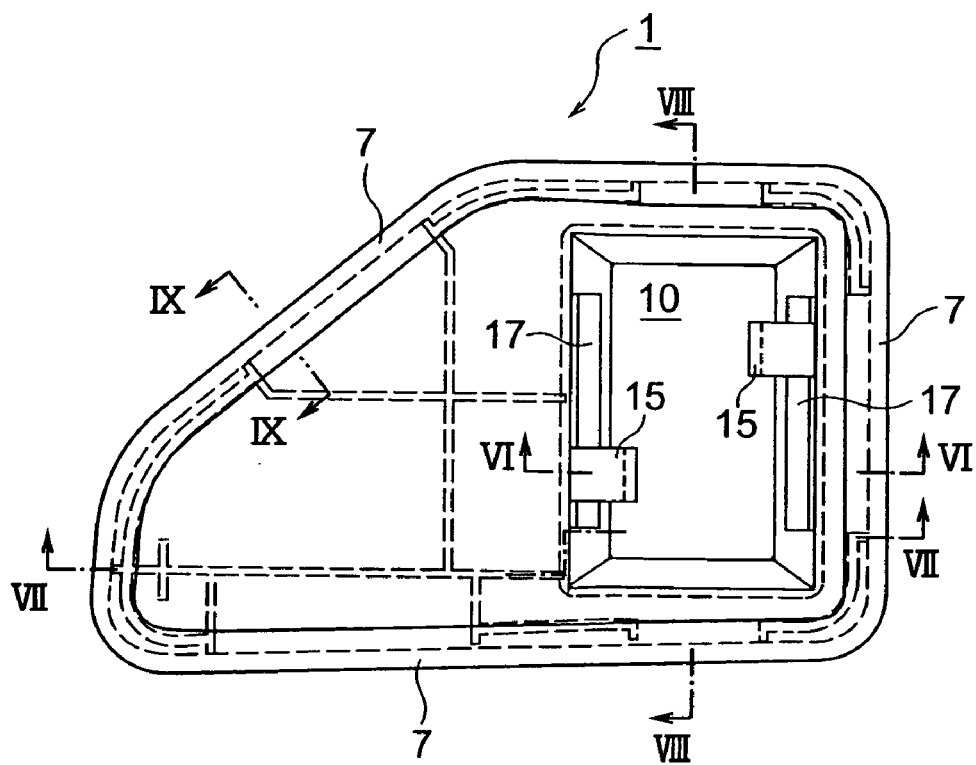
FIG. 2 is a plan view of the clip shown in FIG. 1.
Figure 3:
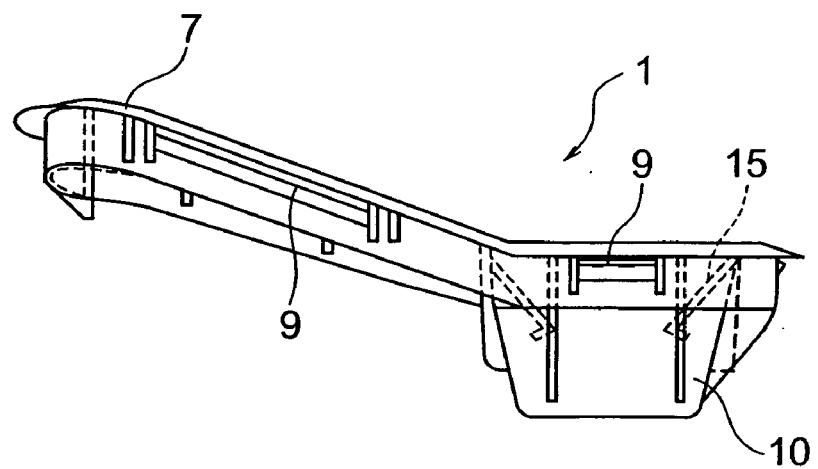
FIG. 3 is a front elevation view of the clip shown in FIG. 1.
Figure 4:
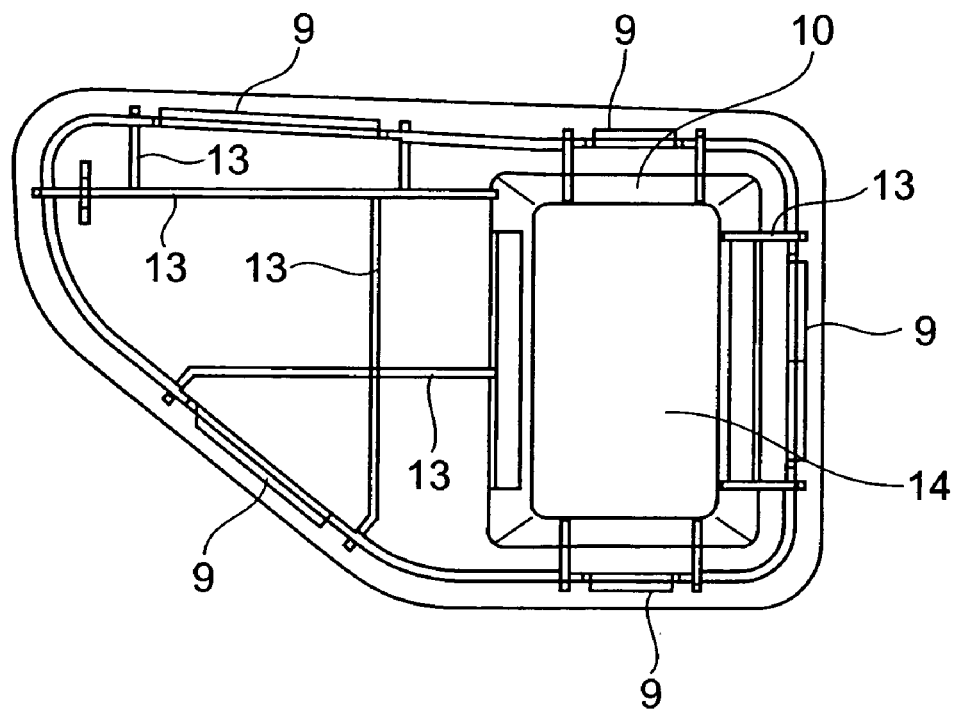
FIG. 4 is an underside plan view of the clip shown in FIG. 1.
Figure 5:
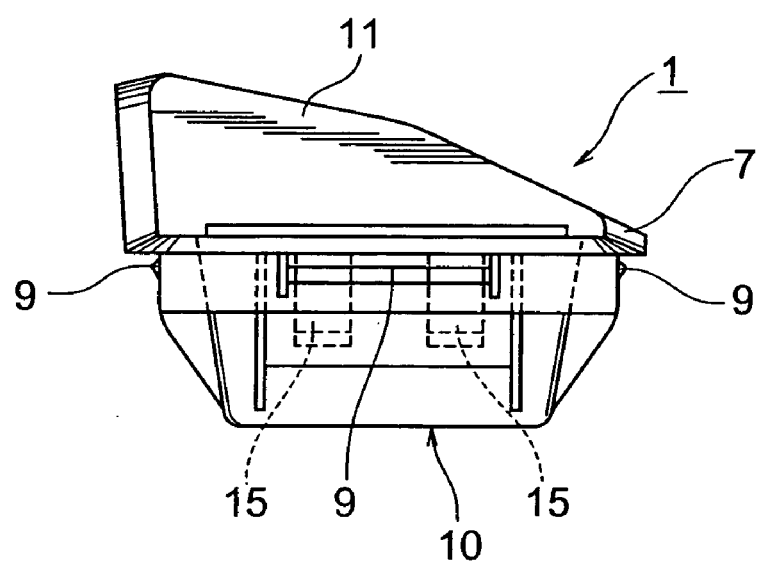
FIG. 5 is a right side elevation view of the clip shown in FIG. 1.
Figure 6:
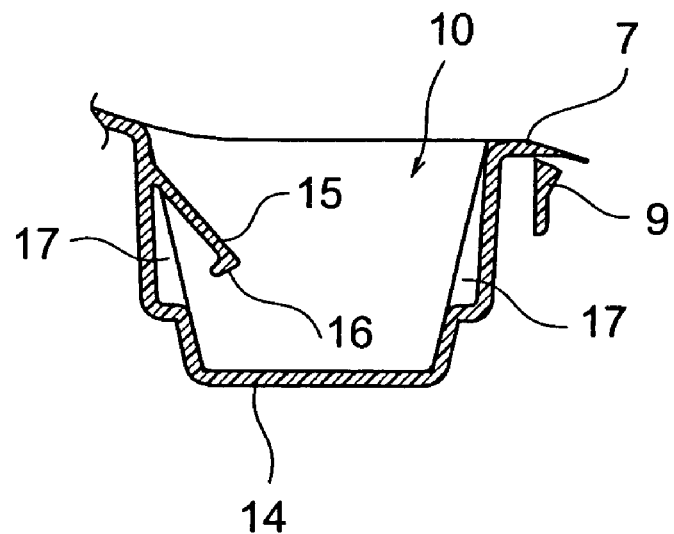
FIG. 6 is a sectional view in the VI-VI plane of the clip shown in FIG. 2.
Figure 7:
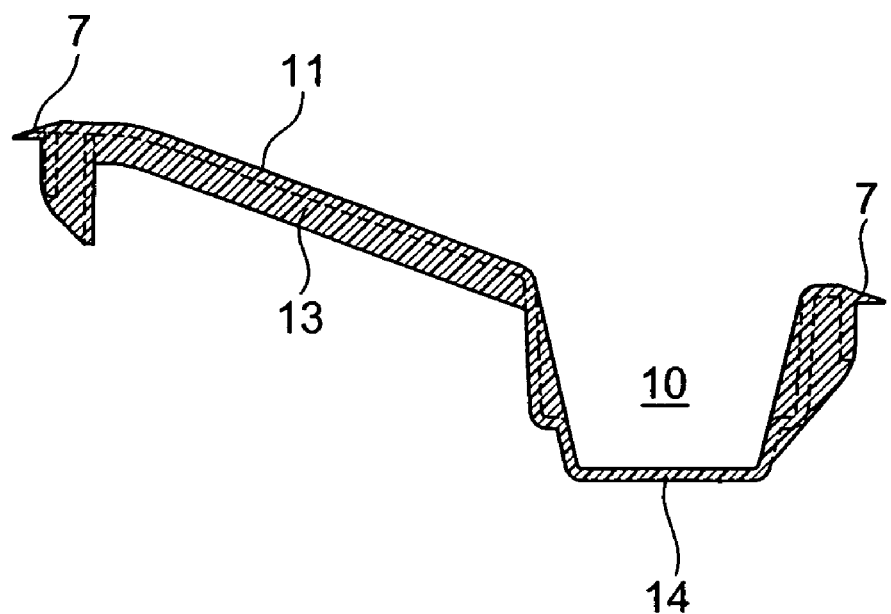
FIG. 7 is a sectional view in the VII-VII plane of the clip shown in FIG. 2.
Figure 8:
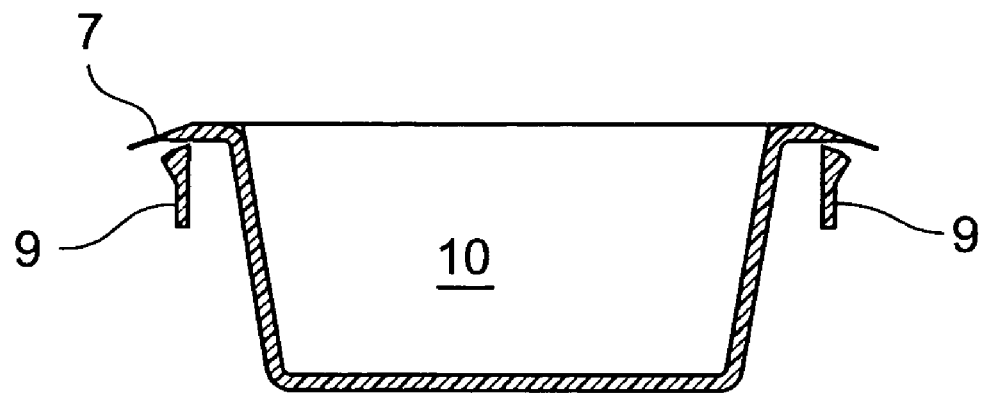
FIG. 8 is a sectional view in the VIII-VIII plane of the clip shown in FIG. 2.
Figure 9:
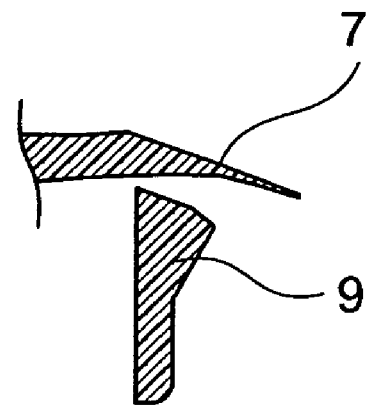
FIG. 9 is a sectional view in the IX-IX plane of the clip shown in FIG. 2.

A flat base part 11 of the clip 1 is determined by the shape of the flange 7, which forms the outer edge of the base part. The clip is formed so as to plug an attachment hole formed in the body panel. Thus, the clip can function as a hole plug for plugging unused attachment holes formed in the body panel. Also, in the back surface of the base part 11, as shown in FIG. 4, a plurality of ribs 13 are formed, extending vertically and horizontally. The portion of the ribs 13 adjacent to the flange 7 should preferably be formed in a shape that narrows toward the tip to facilitate insertion of the clip into an attachment hole (see FIG. 7).

The protection member attaching part 10 is formed as a hollow body projecting perpendicularly from the surface of the base part 11. In the embodiment shown, part 10 is a hollow box shape, substantially rectangular in planar view, with the entrance thereof opening widely, and tapering toward the tip (bottom surface) thereof, so as to accept an engagement part formed in a solid truncated-pyramidal shape (see FIGS. 2 and 4). In the embodiment shown, the protection member attaching part 10 is formed such that its sidewalls are integral with a bottom wall 14. By this arrangement, the flange 7, base part 11, and protection member attaching part 10 form a continuous surface, to provide a watertight seal for the attachment hole. To effect this watertight seal, the flange 7 is preferably formed so as to be thin and elastic so as to seal the entire periphery of the attachment hole.

On the inside of the protection member attaching part 10, second pawls 15 (at least one) are formed for preventing an inserted engagement part from pulling out. The pawls 15 engage concavities (described below) formed in opposing side surfaces of an engagement part having a truncated pyramidal shape. The tip of each second pawl 15 is preferably formed as a curved part 16 (see FIG. 6) for increasing the area of contact, so as to even more definitely prevent the soft engagement part from pulling out. It is also preferable that spaces 17 (see FIGS. 1, 2, 6) be formed on the inner surface of the protection member attaching part 10 to allow the second pawls 15 to retract when a soft engagement part is inserted, so that the soft engagement part will be prevented from being crushed. Each second pawl 15 is preferably formed in a narrow shape so that the second pawls 15 will bend into the spaces 17 when the soft engagement part is inserted.

Figure 14:
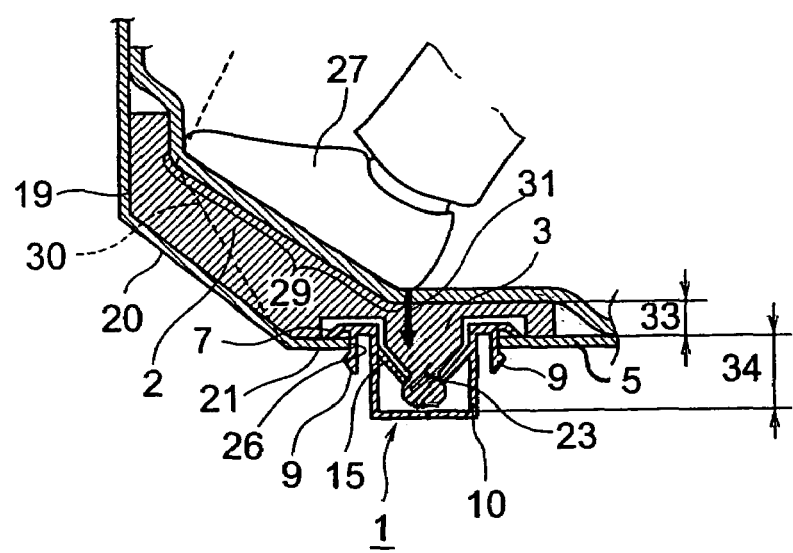
FIG. 14 is a sectional view showing how the clip-equipped protection member shown in FIG. 13 is attached to a body panel.

The main portion of the protection member 2 that absorbs impact energy toward a vehicle occupant is described, for example, in Patent Literature 1 (TOKKAI 2000-331895, gazette). The protection member is a sheet-form member formed of a soft resin material that can broadly cover a dashboard and absorb energy at the time of a collision or impact, i.e., can absorb impact energy toward the feet, for example, of a person in the driver's seat or passenger-side seat. In the present invention, as shown in FIG. 14, for example, the protection member 2 can be attached so as to cover the top of the dashboard 19 and toe board 20 that continues therefrom, where the feet of a vehicle occupant are placed, and also to cover a portion of the floorboard 21, forming an energy-absorbing region for absorbing impact energy.

Figure 10:
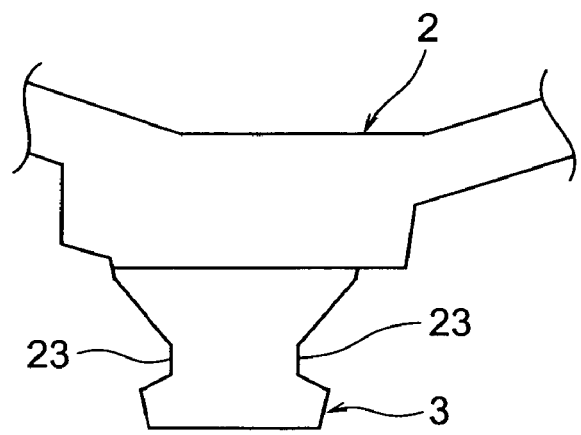
FIG. 10 is a fragmentary view of the engagement part and a portion of the protection member in a protection member attaching apparatus relating to one embodiment of the present invention.

In an embodiment of the present invention, as shown in FIG. 10, an engagement part 3 for engaging the protection member attaching part 10 is formed integrally with the protection member 2, projecting outwardly therefrom at a prescribed position on the sheet-form main body. This projecting engagement part 3 forms the part that attaches the protection member to the body panel by the clip 1. Because the engagement part 3 is formed integrally with the protection member 2, not only is the coupling strength thereof high, but the engagement part 3 itself becomes an impact energy-absorbing portion, and cooperates with the main body portion of the protection member 2 so that the impact energy absorbing power increases. The protection member 2 may be formed of a foam material such as polypropylene (PP) or polystyrene (PS), for example. In addition, on the lower surface side, a sheet-form member such as a dash silencer or the like may be provided in the portion that opposes the dashboard, and on the lower surface at a different place a bulk-increasing sheet-form member may be provided to form the protection member.

Figure 11:
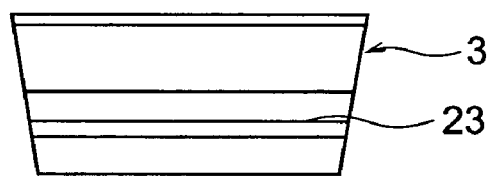
FIG. 11 is a right side elevation view of the engagement part shown in FIG. 10.

In FIG. 11 the engagement part 3 is shown by itself to facilitate description. However, it should be understood that in practice it is integral with the main body of the protection member 2, as shown in FIG. 10. The engagement part 3 protrudes from the sheet-form member of the protection member 2, preferably as a solid truncated pyramid, substantially rectangular in planar view, tapered toward the tip. Because it is solid (not hollow), a certain rigidity can be realized with the same material as the protection member, which may be formed of a soft resin material, and the strength of the attachment to the clip 1 can be enhanced. Furthermore, if the engagement part 3 is formed as a truncated pyramid, the receiving body of the protection member attaching part 10 can be formed as a truncated pyramidal receptacle matched therewith, so that the engagement part 3 can be prevented from turning in the protection member attaching part 10 of the clip 1 (there being a danger of deforming and turning because it is a soft material).

Figure 12:
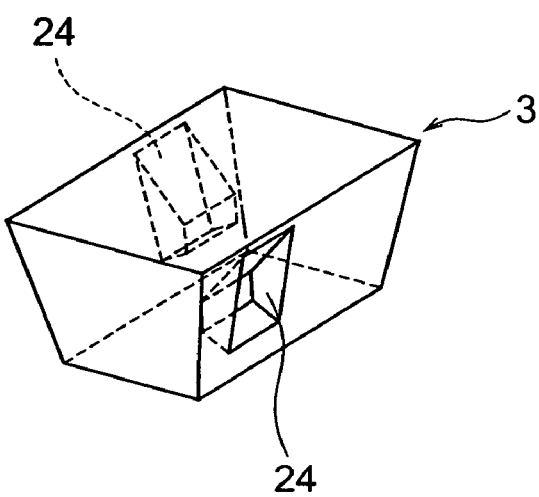
FIG. 12 is a perspective view of a modified embodiment of the engagement part.

In the opposing side surfaces of the engagement part 3, concavities 23 are formed for accepting the second pawls 15 of the clip 1. The concavities 23 shown in FIG. 11 are formed long in the horizontal direction to facilitate acceptance of the second pawls 15. This is not a limiting shape, however, and concavities 24 may be formed as concavities limited to specific positions on opposing side surfaces as shown in FIG. 12. The position and shape of the second pawls 15 will thereby be limited, but the rigidity of the engagement part 3 can then be maintained higher than in the case of channel-shaped concavities 23 which are long in the horizontal direction, and higher attachment strength can be maintained.

Figure 13:
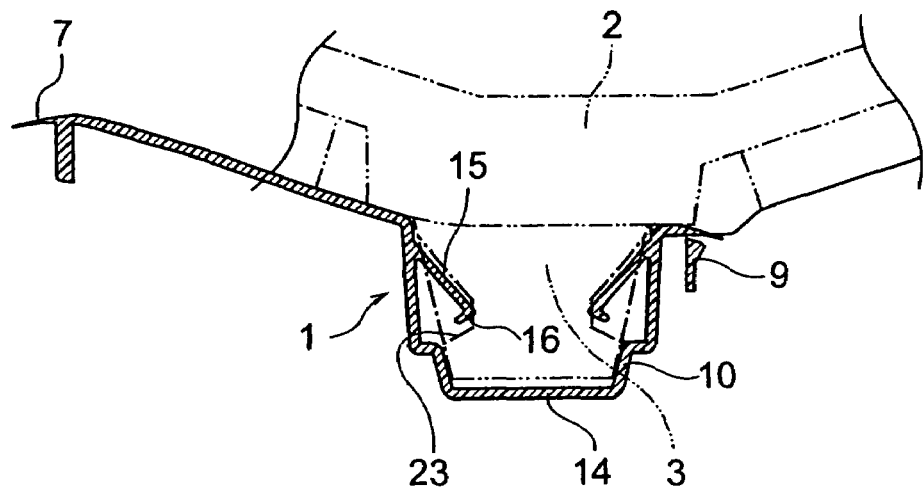
FIG. 13 is a sectional view showing how the engagement part of the protection member is attached to the clip of a protection member attaching apparatus relating to one embodiment of the present invention.

As shown in FIG. 14, the protection member 2 is attached to the body panel 5 by a simple operation using the clip 1. As shown in FIGS. 13 and 14, when the engagement part 3 of the protection member 2 is inserted into the protection member attaching part 10 of the clip 1, the concavities 23 (or 24) of the engagement part 3 accept the second pawls 15 of the clip 1 and engage therewith, whereby the engagement part 3 is prevented from pulling out of the protection member attaching part 10. The protection member 2 to which the clip 1 has been attached can be carried onto an automobile manufacturing or assembly line, the flange 7 of the clip 1 positioned so as to match an attachment hole 26 in the body panel 5, and the clip 1 pushed into the body panel 5. Thereby, the first pawls 9 formed at prescribed locations along the flange 7 engage the edge of the attachment hole 26, and the clip 1 is engaged in the body panel 5 (see FIG. 14). In the attachment operation described above, moreover, it is not essential to pre-attach the clip 1 to the protection member 2. After the clip 1 has been attached in the attachment hole of the body panel 5, the engagement part 3 of the protection member 2 may be attached to the protection member attaching part 10.

In the attaching operation described above, furthermore, an unused hole formed in the body panel should preferably be used as the attachment hole. The clip 1 functions as a hole plug to plug unused holes formed in the body panel. In such cases, the clip 1 is such that the flange 7, base part 11, and the side surfaces and bottom wall 14 of the protection member attaching part 10 form a continuous surface, and the flange 7 is thin and elastic so as to seal the entire periphery of the attachment hole, so that a watertight attachment hole seal is formed.

In the case described above, the protection member 2, as shown in FIG. 14, should preferably be attached so as to cover the top of the dashboard 19 and the toe board 20 continuing therefrom where the feet 27 of a vehicle occupant are placed, thus forming an energy-absorbing region 29 for absorbing impact energy. The broken line 30 in FIG. 14 represents one example of where the dashboard 19 and toe board 20 have been deformed at the time of a front-end automobile collision. If there is no energy-absorbing region 29, the feet 27 will be subjected to a large load, and the lower legs will be injured.

It is preferable that an attachment hole 26 be used which has been formed on the floorboard 21, removed from the energy-absorbing region 29. Describing this in greater detail, the attachment hole 26 used is one that has been formed in the floorboard 21 on the lower side, in the vertical direction, of the protection member 2, at the position where the heels of the feet 27 of a person are placed. When the clip 1 is attached in this attachment hole 26, and the engagement part 3 of the protection member attaching part 10 is held, as indicated by the arrow in FIG. 14, the heels sink into the thick portion containing the engagement part 3 and the main body of the protection member 2, and impact energy is absorbed by the engagement part 3 portion (indicated by numeral 34), thus augmenting the impact energy absorption of the main body of the protection member 2 (indicated by numeral 33), so that the quantity of impact energy absorption is increased.

Figure 15:
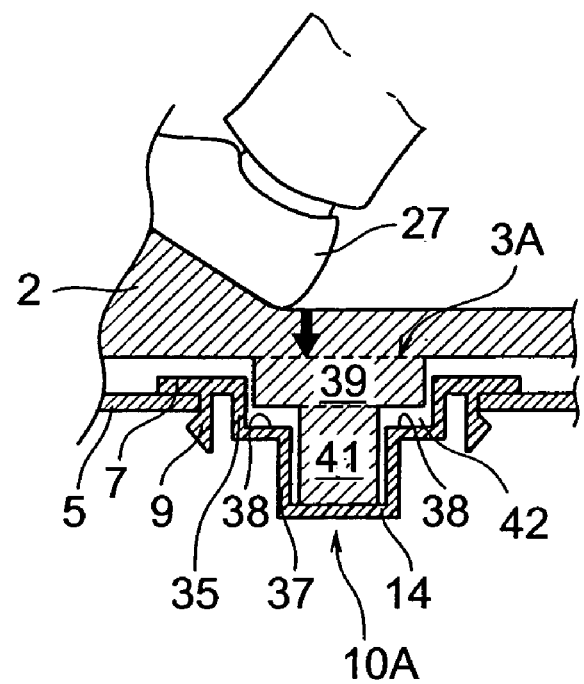
FIG. 15 is a sectional view showing the same thing as FIG. 14 but in a protection member attaching apparatus relating to another embodiment of the present invention.

FIG. 15 shows a modified embodiment to increase the effectiveness of absorbing the impact energy affecting the heel portion of the feet 27. With this embodiment, in a protection member attaching part 10A, a step 38 is formed such that the portion 35 on the flange 7 side becomes wider than the portion 37 on the bottom wall 14 side, at a position of intermediate height along the body shape thereof. An engagement part 3A is formed so as to have a wide portion 39 that can seat in the step 38 of the protection member attaching part 10A, and a tip portion 41, formed narrow to permit insertion farther than the step 38 and which comes flush against the closed bottom wall 14 of the protection member attaching part 10A. The wide portion 39 of the engagement part 3A is formed at such a position as to leave a gap 42 of prescribed height between the wide portion 39 and the step 38 even when the tip portion 41 is flush against the bottom wall 14 of the protection member attaching part 10A. Thereby, when impact energy is applied from the heels of the feet 27 to the engagement part 3A, that impact energy will cause the tip portion 41 to butt against and deform the bottom wall 14, causing deformation such that next the wide portion 39 will butt against the step 38, so that the depth to which the heels sink in can be more easily controlled relative to the magnitude of the load to which the heels are subjected.

Figure 16:
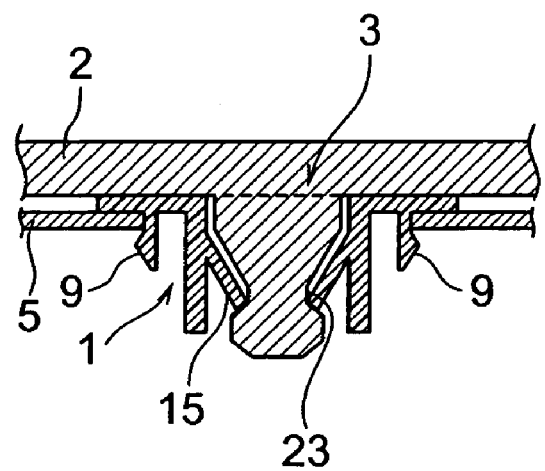
FIG. 16 is a sectional view showing a clip modification.

In a modified embodiment shown in FIG. 16, no bottom wall is formed in the protection member attaching part 10 of the clip 1. Thus, it is permissible to omit a bottom wall of the protection member attaching part 10.

The present invention provides an improved apparatus for attaching a vehicle occupant protection member to a body panel and that does not require welding bolt studs to the body panel. Using a clip of the invention, an assembly of a protection member with the clip can easily be formed prior to attachment of that assembly to a body panel, thereby to form a final assembly that includes the clip, the protection member, and the body panel.

While preferred embodiments have been shown and described, it will be apparent that modifications can be made without departing from the principles and the spirit of the invention, the scope of which is defined in the appended claims. For example, the clip of the invention may be useful in other applications in which it is desired to attach a member to a panel.

What is claimed is:

1. A clip for attaching a member to a panel having an attachment hole therein, comprising:
   a substantially flat elongated base part with an integral peripheral flange and a peripheral rib depending from the flange and disposed to be inserted in the attachment hole; and
   a hollow body projecting from and below the base part with the flange, wherein the flange is constructed to cover an edge of the attachment hole into which the rib and the hollow body of the clip are inserted, at least one pawl adjacent to the rib for engaging an edge portion of the attachment hole to retain the hollow body in the attachment hole, and at least one pawl inside the hollow body for engaging an engagement part of the member inserted in the hollow body.

2. A clip according to claim 1, wherein the hollow body and the engagement part have complementary polygonal cross-sections that prevent turning of the engagement part in the hollow body.

3. An apparatus for attaching a sheet-form vehicle occupant protection member to a body panel, comprising:
   a clip to be attached to the body panel through insertion in an attachment hole therein, for holding the protection member, wherein:
   the clip comprises a substantially flat, elongated base part with an integral peripheral flange to cover an outer edge of the attachment hole, a peripheral rib below the flange with at least one first pawl to be inserted into the attachment hole to engage an edge portion of the attachment hole, and a protection member attaching part formed within the flange to receive and hold an engagement part of the protection member, the attaching part being formed as a hollow body that projects from and below the base part and has at least one second pawl therein to prevent the engagement part from pulling out of the attaching part.

4. An apparatus according to claim 3, wherein the hollow body of the clip is continuous with the base part and the flange so that the clip can form a sealing plug in the attachment hole.

5. An apparatus according to claim 3, wherein the flange is formed so as to surround the entire periphery of the base part and to seal the entire periphery of the attachment hole.

6. An apparatus according to claim 3, wherein the protection member attaching part has a step in the hollow body intermediate the height of the body projecting from the base part.

7. An apparatus according to claim 3, wherein the hollow body and the engagement part have complementary polygonal cross-sections that prevent turning of the engagement part in the hollow body.

8. An assembly comprising:
a clip to be attached to a body panel through insertion of the clip in an attachment hole in the body panel; and
a sheet-form vehicle occupant protection member, formed of a soft material that absorbs impact energy, to be attached to the body panel via the clip, wherein
the clip has a base part with a peripheral flange to cover an outer edge of the attachment hole, at least one first pawl for retaining the clip in the attachment hole after it is inserted therein, and a protection member attaching part formed within the flange to receive and hold an engagement part of the protection member, the protection member attaching part being formed as a hollow body which projects from and below the base part and has at least one second pawl therein for engaging and holding the engagement part inserted in the hollow body, and wherein
the engagement part is an integral, unitary part of, and protrudes from, a main portion of the protection member and is inserted in the hollow body.

9. An assembly according to claim 8, wherein the hollow body and the engagement part have complementary polygonal cross-sections that prevent turning of the engagement part in the hollow body.

10. An assembly according to claim 8, wherein the clip is inserted in the attachment hole.

11. An assembly according to claim 10, wherein the clip forms a plug that seals the attachment hole.

12. An assembly according to claim 10, wherein the flange of the clip covers the entire periphery of the clip and seals the entire periphery of the attachment hole.

13. An assembly according to claim 10, wherein the body panel comprises a dashboard and a toe board continuing therefrom, and the protection member is attached, via the clip, so as to cover both the top of the dashboard and the toe board, to form an energy-absorbing region for absorbing impact energy, and wherein the attachment hole is formed in a floorboard, removed from the energy-absorbing region.

14. An assembly according to claim 10, wherein the attachment hole is formed in a floorboard beneath the protection member, at a position where heels of a vehicle occupant are placed, and the engagement part augments the impact energy absorption of the protection member.

15. An assembly according to claim 10, wherein the hollow body has a step therein at a position of intermediate height in the hollow body, and is wider at a flange-side portion than at an opposite-side portion thereof, the engagement part has a wide portion seated on the step and a narrower portion inserted into the hollow body beyond the step and abutting a bottom wall of the hollow body, the wide portion is formed at a position providing a gap of predetermined height between the wide portion and the step, and the wide portion is formed to abut the step due to impact and to absorb impact energy by deformation of the wide portion.

16. An assembly comprising:
a clip to be attached to a body panel through insertion of the clip in an attachment hole in the body panel; and
a sheet-form vehicle occupant protection member to be attached to the body panel via the clip, wherein
the clip has a flange to cover an outer edge of the attachment hole, at least one first pawl for retaining the clip in the attachment hole after it is inserted therein, and a protection member attaching part formed within the flange to receive and hold an engagement part of the protection member, the protection member attaching part being formed as a hollow body which projects from the flange and has at least one second pawl therein for engaging and holding the engagement part inserted in the hollow body,
wherein the engagement part protrudes from a main portion of the protection member and is inserted in the hollow body, and
wherein the protection member is formed of a soft material that absorbs impact energy, the engagement part is shaped as a solid truncated pyramid, and the hollow body has an interior shape that complements the shape of the engagement part.

17. An assembly according to claim 16, wherein said at least one second pawl comprises a pair of second pawls that engage concavities formed in opposing sides of the engagement part.

18. An assembly according to claim 17, wherein spaces are formed in inner surfaces of the hollow body into which the second pawls can retract when the engagement part is inserted into the hollow body.

* * * * *